United States Patent [19]
Huber et al.

[11] Patent Number: 5,290,505
[45] Date of Patent: Mar. 1, 1994

[54] METHOD OF RECYCLING ADHESIVE-COATED PLASTIC SHEET MATERIAL

[75] Inventors: Gerhard Huber, Waldkraiburg; Karl Pichl, Aschau, both of Fed. Rep. of Germany

[73] Assignee: WNC-Nitrochemie GmbH, Aschau, Fed. Rep. of Germany

[21] Appl. No.: 910,354

[22] PCT Filed: Nov. 26, 1991

[86] PCT No.: PCT/EP91/02238

§ 371 Date: Jul. 22, 1992

§ 102(e) Date: Jul. 22, 1992

[87] PCT Pub. No.: WO92/09413

PCT Pub. Date: Jun. 11, 1992

[30] Foreign Application Priority Data

Nov. 26, 1990 [DE] Fed. Rep. of Germany ....... 4037562

[51] Int. Cl.⁵ ............................................. B29B 17/02
[52] U.S. Cl. ........................................ 264/344; 134/13; 159/2.3; 264/37; 264/211.23; 264/349; 264/DIG. 69; 425/209
[58] Field of Search .............. 264/211.23, 349, 37, 264/DIG. 69, 211.21, 344; 425/208–209, 206, 197; 159/2.2, 2.3; 134/13

[56] References Cited

U.S. PATENT DOCUMENTS

| | | |
|---|---|---|
| 4,028,159 | 6/1977 | Norris ........................ 264/37 |
| 4,280,907 | 7/1981 | Häberle ........................ 425/197 |
| 4,543,364 | 9/1985 | Nankee et al. ..................... 521/40 |
| 4,629,411 | 12/1986 | Bücheler ........................ 264/37 |
| 5,151,026 | 9/1992 | Andersen et al. ................. 425/208 |
| 5,169,588 | 12/1992 | Estepp ....................... 264/DIG. 69 |

FOREIGN PATENT DOCUMENTS

| | | | |
|---|---|---|---|
| 0044507 | 1/1982 | European Pat. Off. ............. | 264/37 |
| 0144495 | 5/1984 | European Pat. Off. . | |
| 0359106 | 5/1991 | European Pat. Off. . | |
| 2703461 | 8/1978 | Fed. Rep. of Germany ................ | 264/211.21 |
| 47-30107 | 8/1972 | Japan ........................ | 264/DIG. 69 |
| 49-41343 | 11/1974 | Japan ........................ | 264/37 |
| 979141 | 12/1982 | U.S.S.R. ........................ | 264/37 |

OTHER PUBLICATIONS

Patent Abstracts of Japan–vol. 10, No. 78 (C–335) (2135) 27. Marz 1986 & JP,A,60 212 434 (Takeda Yakuhin Kogyo K.K.) 24. Oktober 1985 siehe Zusammenfassung.

Patent Abstracts of Japan–vol. 11, No. 282 (C–446) (2729) 11. Sep. 1987 & JP,A,67 079 241 (Mitsumaru Kagaku K.K.) 11. Apr. 1987 siehe Zusammenfassung.

*Primary Examiner*—Jeffery Thurlow
*Attorney, Agent, or Firm*—Bell, Seltzer, Park & Gibson

[57] ABSTRACT

A method is indicated of recycling plastic sheet material coated with adhesive and available in chopped form. The method provides for separating the plastic from the adhesive. In a first method step the chopped sheet material (4) is introduced into a solvent bath (1) where the chopped sheet material (4) is moved for a predetermined dispersing time under mechanical action. The mechanical action preferably is exercized by rolling or kneading. In a second method step, the adhesive dispersed in the solvent is separated from the chopped sheet material (4) by mechanical action of forces—preferably by introducing squeezing forces in a conveyor screw.

11 Claims, 1 Drawing Sheet

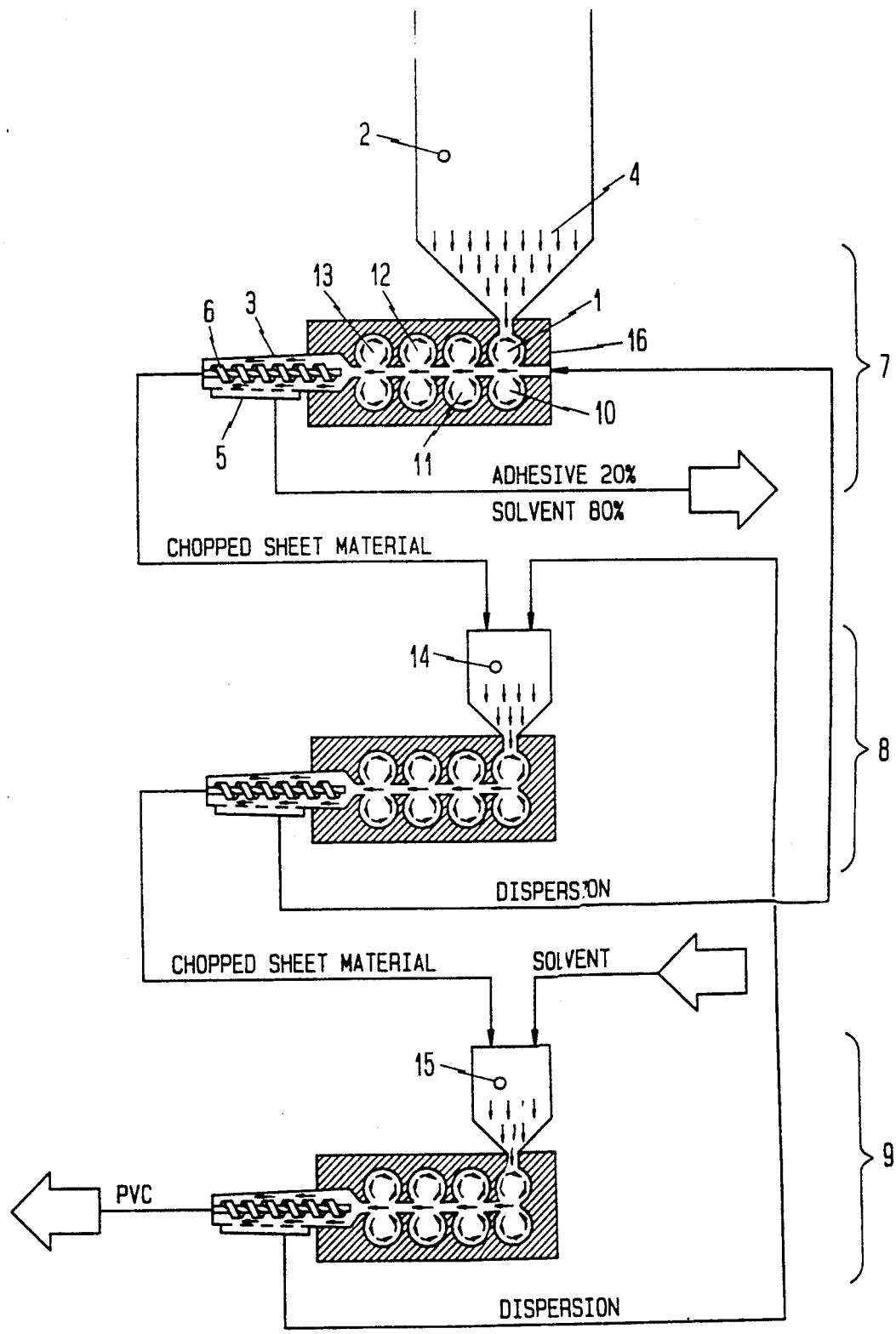

METHOD OF RECYCLING ADHESIVE-COATED PLASTIC SHEET MATERIAL

FIELD OF THE INVENTION

The instant invention relates to a method of recycling plastic sheet material coated with adhesive and available in chopped form by separating the plastic from the adhesive.

BACKGROUND, OBJECTS AND SUMMARY OF THE INVENTION

The underlying problem in the first place pertains to the art of manufacturing adhesive tapes from plastics but it is transferable equally well to any kind of plastic material which is coated with adhesive. The manufacture of plastic adhesive tapes and of the other materials mentioned involves the production of waste, for instance, in the form of marginal strips cut off from the material in the manufacturing process. In a more general sense the term "plastic waste coated with adhesive" preferably is understood as relating to waste of thermoplastic materials, especially polyethylene, polypropylene, polystyrene, polyester, and polyvinyl chloride (PVC). Even in optimized manufacturing processes the proportion of this waste—among others also due to rejects—still accounts for some 10% of the production and, as a rule, results in the form of chopped sheet material of varying size, preferably between 1 and 10 mm long, at the manufacturer's of plastic film or sheet material. It is not only economic for reasons but also under environmental aspects that renewed use is aimed at of this adhesive coated plastic sheet material waste in the form of its separated components.

An economically operating process of the kind mentioned initially is unknown. True, DE-OS 38 31 023 discloses a beneficiation method for reuse of soiled plastic products wherein the chopped sheet material is agitated in a washing solution of organic solvents and subsequently removed from the washing solution in a turbulence-free zone, then predried mechanically by centrifugal force, and thereafter redried thermally by hot gas, the solvent being recycled from the drying stage into the washing stage. However, this known method is not suited to achieve the aim of the instant invention, namely the sustained separation of the adhesive from the plastic sheet material, or not so in an economic manner. Rather, the known method is directed at cleaning the plastic waste mentioned from contamination; the method steps in that case are not adapted to bring about sufficient separation of adhesives from the chopped sheet material, which adhesives stick quite firmly to the chopped sheet material, such as rubber-based adhesives which are not soluble in water and glycol.

It is the object of the invention to indicate a method of the kind mentioned initially for separating the adhesive from the chopped sheet material by means of a solvent in an economic and reliable way.

This object is met, in accordance with the invention, in that (a) the chopped sheet material is kneaded for a predetermined period of time while the solvent is being added so that the adhesive will become dispersed in the solvent;

(b) subsequently the solvent-adhesive dispersion is separated from the chopped sheet material by the action of mechanical force and discharged.

The kneading of the adhesive-coated chopped sheet material in the presence of the solvent in method step (a) turns the adhesive and the solvent into a pasty, honey-like dispersion which can be separated from the chopped sheet material in the subsequent method step (b), for example by squeezing or shearing forces. It is an advantage of the novel process that reliable separation is achieved and that it is economical because the residence time of the chopped material is short and little solvent is used as compared to the amount of adhesive to be separated. In addition, the adhesive is yielded in the form of a solvent-adhesive dispersion which also permits direct renewed used of the adhesive, such as by applying it on sheet material.

To obtain particularly clean chopped sheet material, the novel method preferably is carried out in two stages, or best in three stages, where method steps (a) and (b) present one first stage of the process which is followed by a second stage or by second and third stages, each comprising steps (a) and (b). Here the chopped sheet material being treated always comes from the preceding stage, the solvent-adhesive dispersion obtained in the second stage and, where applicable, in the third stage is supplied to the respective preceding stage as the solvent, and fresh solvent is used only in the last stage.

To carry out method step (a), it is preferably provided that the dispersing of the adhesive sticking to the chopped sheet material is effected with the solvent in a respective closed kneader, especially a multi-stage kneader. It may be sufficient to use a kneader with less kneading steps in the second or third stages of the method than in the first ones. Suitable kneaders are commercially available.

As regards the second method step (b), it is preferably suggested that the separation of the dispersed adhesive from the chopped sheet material be effected by introducing squeezing forces in a conveyor screw whose volume per unit length decreases in conveying direction and whose shell consists of a perforated plate through which the solvent-adhesive dispersion can pass. The decrease in volume per unit length of the conveyor screw may be realized either by a variation in pitch of the screw shaft or by a casing configuration which converges in conveying direction.

As an alternative, the separation of the dispersed adhesive from the chopped sheet material may be effected by introducing shearing forces in a vessel at the bottom of which two coaxial wing rotors are arranged which rotate in opposite sense in a radial plane and between the wing groups of which there is a cylindrical separating zone. Particularly high shearing forces are created in this cylindrical separating zone to which the chopped sheet material is fed by flow created in the vessel, and these shear forces permit clear separation of the dispersed adhesive from the chopped sheet material, as with the first alternative.

The type of solvent used essentially depends on the type of adhesive which adheres to the chopped sheet material. Experience made in the testing phase of the instant process has shown that the solvent preferably should have a boiling point of from 40° to 90° C., especially from 50° to 70° C.

The preferred solvent is benzine having a maximum benzene content of 1%. The limitation of the benzene content is made in view of safety regulations. The benzine is light benzine consisting of straight chain or branched, preferably branched, saturated hydrocarbons, pentane and hexane being suitable in consideration of the preferred boiling points. However, as hexane is not preferred for use because of the risk involved, it is more advantageous to apply a mixture of pentane and hexane or, most preferably, pentane alone.

The preferred process temperature lies at a value between 25° and 35° C., and the dispersing time in the first stage is about 3 minutes.

Preferably the dispersion to be withdrawn from the first stage of the process and to be returned to the manufacturer of the sheet material has a mixing ratio of approximately 20% of adhesive and 80% of solvent. In this manner the requirements both of the manufacturer of sheet material and of the instant can be taken into account.

DESCRIPTION OF THE DRAWINGS

The drawing consists of a diagrammatic flow chart of the process stages of a preferred embodiment of this invention.

DETAILED DESCRIPTION OF PREFERRED EMBODIMENT OF THE INVENTION

A preferred embodiment of the method, comprising a four-stage kneader in each stage of the process will be explained below with reference to a diagrammatic flow chart.

The diagram illustrates a countercurrent method comprising altogether three stages. In a first stage 7 of the process, chopped sheet material 4 coated with adhesive is supplied through a reservoir 2 to a first stage 10 of a kneading apparatus 16 including a total of four stages. This chopped sheet material 4 in practice may be wetted with water, whereby suppliers (manufacturers of sheet material) intend to prevent the chopped sheet material from agglomerating. The water thus entering the process does not disturb the process since it forms an azeotrope together with the benzine and, during later reuse of the adhesive, evaporates with the solvent.

The solvent bath 1 within the kneading apparatus 16 is fed by the adhesive-solvent dispersion exiting from the conveyor screw 3 of the second stage 8 of the process. All the kneading stages 10 to 13 of the kneading apparatus 16 comprise respective kneading rotors (not shown) which pass along the chopped sheet material 4 in conveying direction (to the left in the diagram) from one kneading stage to the next. After a residence time (dispersing time) of the chopped sheet material of about 3 minutes in the solvent bath 1, a pasty, honey-like dispersion has formed of the adhesive and the solvent, this dispersion still adheres to the chopped sheet material 4 when the latter issues from the fourth kneading stage 13. The kneading apparatus 16 is followed in conveying direction by a conveyor screw 3 having a conveyor shaft 6 whose volume per unit length decreases in conveying direction due to convergence of the shell of the conveyor screw 3. This decrease in volume per unit length causes squeezing forces to be introduced between the screw shaft 6 and the inside of the shell of the conveyor screw 3, whereby mechanical separation of the dispersion adhering to the chopped sheet material 4 is caused. This adhesive-solvent dispersion exits through a perforated plate 5 located in the shell of the conveyor screw 3. In the case of this first stage 7 of the process, the exiting dispersion already is the mixture which is returned to the manufacturer of the sheet material. It has a mixing ratio, for example, of 20:80.

The chopped sheet material 4 extruding from the conveyor screw 3 of the first stage 7 of the process already is largely free of adhesive and is supplied through a buffer reservoir 14 to a second stage 8 of the process. In this second stage 8 of the process the chopped sheet material 4 is further cleaned and final separation of the adhesive from the chopped sheet material takes place. The second stage 8 of the process and the third stage 9 as well are of the same basic structure as the first stage 7 of the process. For reasons of clarity, therefore, the same members were not marked by reference numerals. The dispersion exiting through the perforated plate 5 of the conveyor screw 3 of the second stage 8 of the process is fed in countercurrent to the solvent bath 1 of the first stage 7 of the process. The solvent bath of the second stage 8, on the other hand, receives its solvent (dispersion) from the conveyor screw 3 of the third stage 9 of the process whose solvent bath is fed with fresh solvent through buffer reservoir 15. The chopped sheet material 4 extruding from the conveyor screw 3 of the second stage 8 of the process likewise is supplied to the buffer reservoir 15 of the third process stage 9.

The countercurrent method thus resides in supplying the chopped sheet material successively to the various process stages 7 to 9, while the fresh solvent is added in the third process stage 9 and then fed in opposite sequence, as an adhesive-solvent dispersion, first to the second stage 8 and then to the first stage 7 of the process.

In the process described, benzine is the preferred solvent used. It has a boiling point between 50° and 70° C. and a maximum benzene content of 1%. Chemically, the benzine preferably is pentane. Likewise conceivable is hexane or a mixture of pentane and hexane.

The process temperature preferably is maintained at a value between 25° and 35° C. at which a dispersing time in the first stage 7 of the process of about 3 minutes is obtainable.

What is claimed is:

1. A method, of recycling plastic sheet material coated with adhesive and available in chopped form by separating the plastic from the adhesive, comprising the following steps:
   a) moving the chopped sheet material for a predetermined period of time in a solvent for the adhesive through a multi-stage kneader, so that the adhesive will become dispersed in the solvent;
   b) subsequently separating the adhesive dispersed in the solvent from the chopped sheet material by mechanical force.

2. A method, of recycling plastic sheet material coated with adhesive and available in chopped form by separating the plastic from the adhesive, comprising the following steps:
   a) moving the chopped sheet material for a predetermined period of time in a solvent for the adhesive under the impact of a mechanical force in a first processing stage, so that the adhesive will become dispersed in the solvent;
   b) separating the adhesive dispersed in the solvent from the chopped sheet material by mechanical force in such first processing stage;
   c) feeding the separated chopped sheet material from the first processing stage to a second processing stage;

d) feeding fresh solvent to the separated chopped sheet material in the second processing stage;
e) moving the chopped sheet material for a predetermined period of time in the solvent for the adhesive under the impact of mechanical force in the second processing stage, so that the remaining adhesive will become dispersed in the solvent;
f) separating the solvent-adhesive dispersion from the chopped sheet material by mechanical force in the second processing stage; and
g) feeding the separated solvent-adhesive dispersion from the second processing stage to the first processing stage.

3. A method, as set forth in claim 2, further including:
h) feeding the separated chopped sheet material from the second processing stage to a third processing stage;
i) feeding fresh solvent to the separated chopped sheet material in the third processing stage;
j) moving the chopped sheet material for a predetermined period of time in the solvent for the adhesive under the impact of mechanical force in the third processing stage, so that the remaining adhesive will become dispersed in the solvent;
k) separating the solvent-adhesive dispersion from the chopped sheet material by mechanical force in the third processing stage; and
l) feeding the solvent-adhesive dispersion from the third processing stage to the second processing stage.

4. A method, as set forth in claim 2 or 3, wherein the step of moving the chopped sheet material in a solvent under the impact of mechanical force in each processing stage further comprises moving the chopped sheet material through a multi-stage kneader.

5. A method, as set forth in claim 1, 2 or 3, wherein the step of separating the solvent-adhesive dispersion from the chopped sheet material in each processing stage further comprises applying squeezing forces to the chopped sheet material by a screw conveyor.

6. A method, as set forth in claim 1, 2 or 3, wherein the step of separating the solvent-adhesive dispersion from the chopped sheet material in each processing stage further comprised applying shearing forces in a screw conveyor.

7. A method, as set forth in claim 1, 2 or 3, wherein the solvent has a boiling point of from 40° C. to 90° C.

8. A method, set forth in claim 7, wherein the solvent used is benzine having a maximum benzine content of 1%.

9. A method, as set forth in claim 1, 2 or 3, further including maintaining a process temperature at a value between 25° C. and 35° C.

10. A method as set forth in claim 1, 2 or 3, wherein the predetermined time of moving the chopped sheet material in the solvent in the first processing stage is about 3 minutes.

11. A method as claimed in claim 1, 2 or 3, wherein solvent is supplied such that the solvent-adhesive dispersion separated will have a mixing ratio of approximately 20% of adhesive and 80% of solvent.

* * * * *